Aug. 4, 1931. J. C. WICHMANN 1,817,329
RADIUM EMANATION JAR
Filed March 22, 1926 2 Sheets-Sheet 1

Inventor
John C. Wichmann
by Haygood & Miller
Attorneys

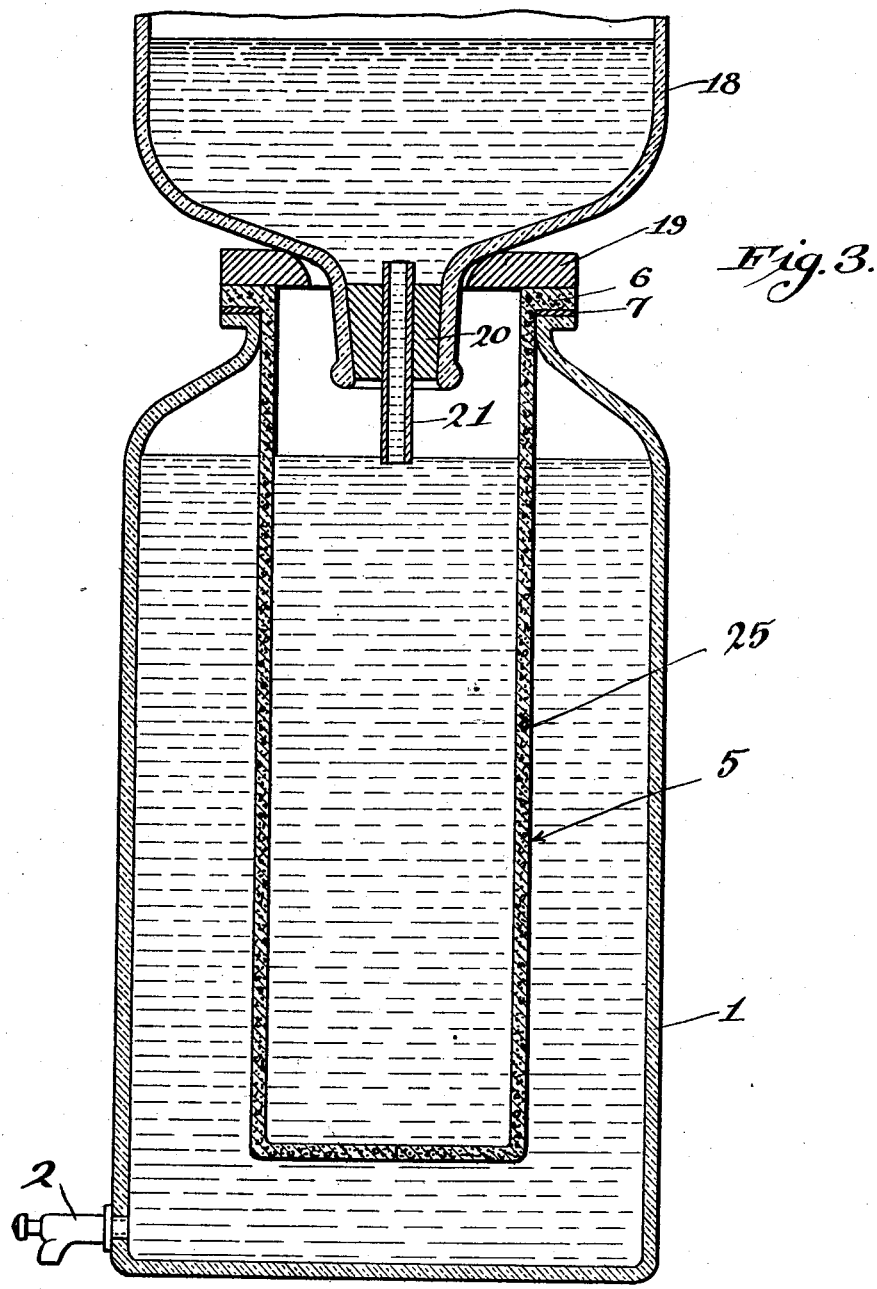

Patented Aug. 4, 1931

1,817,329

UNITED STATES PATENT OFFICE

JOHN C. WICHMANN, OF LOS ANGELES, CALIFORNIA

RADIUM EMANATION JAR

Application filed March 22, 1926. Serial No. 96,639.

My invention is a radium emanation jar adapted to charge drinking water with the emanations from radium.

An object of my invention is the construction of a radium emanation jar whereby water may become highly charged with the emanations from radium, thereby forming a manner of treatment in radium therapy, and also providing a jar containing drinking water for ordinary use.

An object of my invention is to arrange the radium containing substances in such a manner that the water will be brought into intimate contact therewith, and also to have a large number of surfaces from which emanations of radium progress, whereby the body of water in the jar may be subject to a large number of emanations.

A further object of my invention is to provide a filtering jar through which water may be filtered, the water coming into contact with the radio active substances in the filtering operation.

A further object of my invention is to provide a container or receptacle for drinking water, the water being continuously passed through a filter having radium therein, the water preferably being fed from an overhead source of supply and the receptacle and filtering device being closely sealed to retain the air which becomes charged with the radium emanations.

Another object of my invention is to incorporate radio active substances in a porous filter, by baking with clay or the like, thereby forming a water filter and to support between inner and outer filters, a layer of radio active material in substantially its natural condition or concentrated.

A further object of my invention is in passing water through a layer of crushed radioactive material, this layer being preferably supported between two parallel vertical walls of porous material and in this connection as the crushed material contains fine particles, some of these fine particles are carried by the flowing water into the adjacent porous wall.

My invention is illustrated in—

Figure 1, which is a vertical section through a radium emanation jar and a water receptacle, illustrating also a source of water supply;

Fig. 3 is a vertical section through the radium emanation jar, illustrating the construction when using only the outer filter jar.

Figure 1:
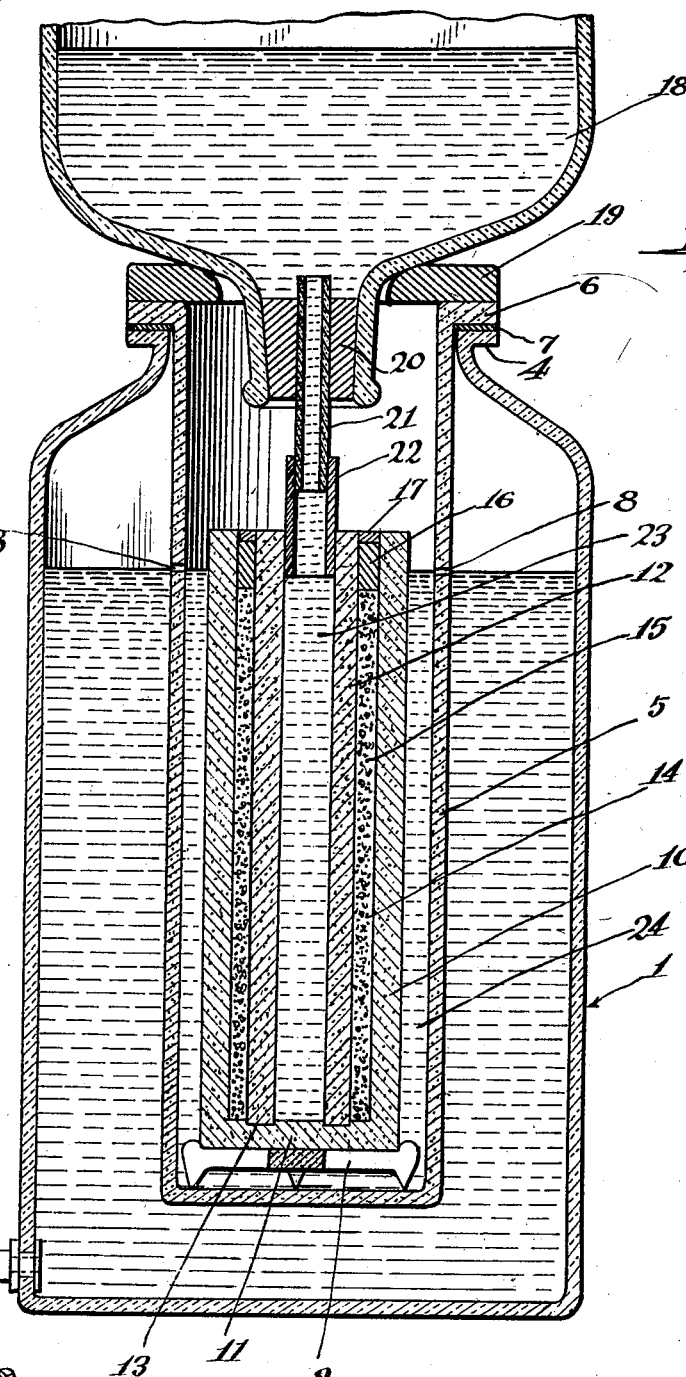

A water receptacle indicated by the numeral 1 is preferably a glass jar having a faucet 2. If desired, the jar may be made of porous material to cool the water by evaporation. The jar has a wide opening at the top and is preferably provided with a flat outwardly extending flange 4 at the neck.

The outer jar 5 is preferably made cylindrical, having a flange 6 adapted to rest on the flange 4 of the neck, with a sealing gasket preferably of rubber therebetween. This jar is made of porous material as hereunder set forth and has a series of small apertures 8 extending circumferentially thereabout, adjacent the top of the jar.

Figure 2:
Fig. 2 is a perspective view of a suitable stand for the inner filter cell.

A stand 9 shown in Fig. 2, is preferably formed of burnt magnesite or other suitable inert material which will not affect the water. An inner filter cell 10 also formed of porous material rests on the stand 9. This is preferably cylindrical, having a closed base 11. An inner porous tube 12 is preferably formed open at both ends and fits into an annular groove 13 in the base of the filter 10. This leaves an annular space 14 which is filled with radio active material 15 as hereunder set forth. A suitable plug 16 of wood or rubber closes the top of the annular space having the radio active material, this preferably also being sealed with a layer of wax 17 at the top.

A water supply bottle 18 is inserted neck down in the jar 5 resting on a rubber or other suitable sealing ring 19. A cork or stopper 20 is provided preferably with a glass tube 21 from which leads a short rubber tube 22 extending downwardly into the central space 23. The jar 5, the filter cell 10 and the porous tube 12 are preferably made from clay having an ore containing 1c radium mixed therein before burning as carnotite or pitch blende, or having both these in proper mixtures. I may also incorporate with the clay, radium salts if desired to increase the radio active material in the various porous filtering elements.

Carnotite melts at substantially 1850° C. and I preferably in forming the porous filtering elements burn the clay at a maximum temperature of 1500° C. If there are any deleterious materials in the clay such as arsenic or the like, these are volatilized and burned off so that they cannot be taken up in solution in the water.

The radio active material 15 may be any suitable material or ore having radium therein in one form or the other. I find that carnotite or pitch blende either singly or both mixed together are suitable. If desired however, I may add radium salts to such materials. It is preferable to use carnotite or pitch blende concentrated to a sufficient extent so that the radium content therein is a higher percentage than in the natural minerals.

The manner of operation of my radium emanation jar is substantially as follows:

It is now known that the various minerals containing radium and the various radium salts give out emanations which are found to be an inert gas. This gas is known by the name of niton. Apparently the gas is held in solution in water and in one form of radium therapy the person being treated drinks a designated quantity of this water daily, the water being known to contain so many mache units per volume. I find that with my radium emanation jar I may charge the water to substantially 3000 mache units per litre, provided the water is not drawn off too rapidly. This represents a relatively high charge of the emanations in the water and compares favorably with the radium emanations found in some natural spring waters which are noted for their radium properties.

It is to be understood that the various clay vessels are sufficient porous so that the water will flow through freely enough to supply the quantity drawn from the faucet. The apertures 8 are slightly below the end of the rubber tube 22 so that the water in the central space is under a hydraulic head compared with the water level in the receptacle. When water is drawn out of this receptacle the water level drops and as the water filters through the tube 12 and the cell 10 it fills up the outer annular space 24 filtering through the walls of the outer jar 5 until the water flows through the apertures 8. As the water is drawn from the bottle 18 the air in the top of the container 1 and above the filter cell 10 passes through the various porous elements and upwardly through the rubber tube 22 and the glass tube 21 into the bottle.

It will be understood that there is a certain amount of leakage of air between the sealing ring 19 and the supply bottle 18 so that when water is drawn off from the faucet 2 air may enter or should this be a tight seal air will bubble in through the faucet 2. The walls of the outer filter 5 are sufficiently porous to allow air to filter through as well as the water.

The inner filter comprising the inner filter seal 10, the porous tube 12 and the filling 15 of radio active material is sufficiently porous to allow air to pass therethrough so that the air may bubble up through the rubber tube 22 into the supply bottle. Or as this tube is usually made flexible the air may pass along the walls of the tube into the space 23 and thence upwardly to the supply bottle.

If water is used which has a certain amount of sediment, most of this sediment is deposited in the central space 23 and some of it may be deposited in the space 14 having the radium ore or the like held therein. This can however, be readily washed out, leaving the radio active materials in their former condition.

It will therefore be seen that my radium emanation jar is a sanitary device for charging drinking water with the radium emanations and that it is efficient for this purpose.

Although I have directed my description above more to the structure of the jar than to my method or process of charging water with radium emanations, nevertheless it is to be understood that I have developed a method of so charging water, by passing water through filters preferably of calcined clay and having a radium emanation material imbedded therein. A material I have found satisfactory is carnotite or pitch blende or both, or if desired various radium salts.

My method also comprises passing the water through such filter with natural radium emanation material secured between a plurality of filters.

My invention also comprises the method of making a proper filter by calcining clay at a high temperature having carnotite or pitch blende or both mixed therein, or with a radium salt mixed therein. Another feature of my invention is the particular filter of the above mentioned compositions.

In Fig. 3 I illustrate my radium emanation jar utilizing as the filtering and radium charging means, only the outer jar 5. This is satisfactory for general domestic or household purposes, giving a sufficient charge to the water when it is not drawn off to too great an extent. However, for professional or hospital use, it is advisable in addition to use the inner filter with the layer of radio active material through which the water passes.

In Fig. 3 the various elements of the construction are designated by the same numerals as in Fig. 1 and it is attempted to indicate the radio active material embedded in the material of the filter by the numeral 25, indicating the series of black dots to show that this material forms part of the structure of the filter. As above mentioned, this may be an ore containing radium such as carnotite or pitch blende, or other suitable ores or insoluble radium salts. The layer 15 of radio active material as above mentioned is preferably formed of an ore containing radium and is broken or crushed to have sufficiently small particles. Of this crushed ore, some of it is very fine, being substantially pulverized and when the water flows through the filter I find that a certain amount of the pulverized material is carried into the inner filter jar 10 when this material is made sufficiently porous, thereby becoming firmly imbedded therein and preventing the washing away, and also increasing the radio active properties of such filter jar.

My invention is characterized in that the filter jars form containers for water, the water flowing out of the supply bottle into said jars and when the water is drawn off the faucet 2 a hydraulic pressure head is created in the container filter jars which forces the water through the walls of the jar. This action occurs in the construction of Fig. 1, in which an inner tube receives the water drawn from the bottle, the water passing through the loose radium material, through the walls of the inner jar, filling the outer container jar, and then passing from this jar to the receptacle 1. An additional function is having the radium contained in the walls and as a loose structure between the inner tube and the wall of the inner container is in the large surface from which emanations are being discharged, which surface is covered with water, hence the emanations are absorbed without being lost in the air.

My invention in other characteristics distinguishes from various types of devices for charging water with radium types of emanations, with which the radio active materials are incorporated in the clay structure or the like, this being merely emersed in water; and also from other devices in which radio active material is suspended in a foraminous container, and also my invention distinguishes from other devices in which the radio active material is insulated from direct contact with the water.

Although my arrangement is of a simple construction, it will nevertheless be apparent that the general arrangements and specific details may be considerably changed to form different types of filters, whether embodied in a containing jar for the filtered and emanation charged water or not. Such changes would be within the spirit of my invention as set forth in the description, drawings and claims.

Having described by invention, what I claim is:

1. A radium emanation jar comprising in combination a water receptacle having a neck, an outer porous tubular jar having a closed base suspended from the neck, means forming a gas tight seal between the jar and neck of the receptacle, a tubular porous inner cell having a closed base, said cell being supported on the base of the jar, an inner porous tube resting on the base of the inner cell, a layer of crushed radio-active material between the inner cell and the porous tube, and means to supply water to the interior of the porous tube, the said jar, inner cell and tube having radio active material embedded therein.

2. A radium emanation jar comprising in combination a water receptacle having a neck with a flange, an outer porous tubular jar having a closed base, said jar having a flange resting on the flange of the neck, means forming a gas tight seal between the jar and neck of the receptacle, an inner porous tubular cell having a closed base resting on the bottom of the jar, an inner porous tube resting on the base of the inner cell, a layer of crushed radio active material between the porous tube and the cell, a plug inserted at the top of the radio active material between the porous tube and the inner cell, a water bottle supported upon the flange of the jar, and means to supply water from the bottle to the interior of the porous tube, the jar, the inner cell and the porous tube having radioactive material embedded therein.

In testimony whereof I have signed my name to this specification.

JOHN C. WICHMANN.